United States Patent
Minami

(10) Patent No.: US 7,149,850 B2
(45) Date of Patent: Dec. 12, 2006

(54) MEMORY CONTROL APPARATUS EXECUTING PREFETCH INSTRUCTION

(75) Inventor: Toshiaki Minami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 10/670,299

(22) Filed: Sep. 26, 2003

(65) Prior Publication Data

US 2004/0123021 A1    Jun. 24, 2004

(30) Foreign Application Priority Data

Sep. 30, 2002    (JP)    ............................. 2002-285577

(51) Int. Cl.
  *G06F 13/00*    (2006.01)
(52) U.S. Cl. ..................................... 711/137
(58) Field of Classification Search ................ None
  See application file for complete search history.

(56) References Cited

U.S. PATENT DOCUMENTS

| | | | | |
|---|---|---|---|---|
| 5,522,055 A | * | 5/1996 | Kamanaka et al. | 711/113 |
| 5,761,452 A | * | 6/1998 | Hooks et al. | 710/116 |
| 6,587,920 B1 | * | 7/2003 | Mekhiel | 711/118 |
| 6,636,927 B1 | * | 10/2003 | Peters et al. | 710/309 |
| 6,970,978 B1 | * | 11/2005 | Wu | 711/137 |
| 2003/0233492 A1 | * | 12/2003 | Schelling | 709/400 |

* cited by examiner

*Primary Examiner*—Reginald Bragdon
*Assistant Examiner*—Craig E Walter
(74) *Attorney, Agent, or Firm*—Fitzpatrick, Cella, Harper & Scinto

(57) ABSTRACT

A memory controller reads data from DRAM at a request from a plurality of masters. It includes a prefetch buffer for storing a result of a pre-reading operation, and a register for setting a specific master among a plurality of masters. When a master requests a read, the memory controller pre-reads data subsequent to the requested data, and determines whether or not the master is a specific master set by the register. If the master is the specific master set by the register, then the result of the pre-read is stored in the prefetch buffer. Thus, the prefetch buffer can effectively function in a system having a plurality of masters.

8 Claims, 6 Drawing Sheets

FIG. 6

| BUS MASTER | BUS MASTER ID |
|---|---|
| 220 | 00 |
| 221 | 01 |
| 222 | 10 |
| 223 | 11 |

MEMORY CONTROL APPARATUS EXECUTING PREFETCH INSTRUCTION

BACKGROUND OF THE INVENTION

1. Field of the Invention

The present invention relates to a memory control apparatus capable of executing a prefetch instruction.

2. Related Background Art

Recently, the CPU speed seems boundless, and increases at an annual rate more than 1.5 times. In this connection, the amount of data transferred in a unit time between the CPU and main storage increases correspondingly. To relax this tendency, by using locality of memory access there has been the technology of increasing the capacity of cache provided in the CPU and configuring it in a hierarchical structure so that a high-speed memory access can be attained. However, it has become more and more difficult to solve the problem of an increasing gap between the operating speed of the CPU and the speed of access to the main storage.

To efficiently solve this problem, it is necessary to drastically speeding up the access to the main storage (memory bandwidth) itself. Currently, main storage of a personal computer (PC) is dynamic RAM (DRAM) which is normally semiconductor memory. Since the speed of the CPU has exceeded the speed attained by the progress of a semiconductor device itself, it is also necessary to attain the high-speed operation of DRAM by an effective circuit configuration or an available efficient system.

In this situation, there have been various systems suggested and put into practice to improve the memory bandwidth. One of the new systems recently receiving much attention is direct Rambus DRAM. With the direct Rambus DRAM, the concept of a channel is adopted to realize a high memory bandwidth of 1.6 GB/sec at maximum per channel.

FIG. 1 shows an example of a transfer protocol for an RSL channel of the direct Rambus DRAM. With the direct Rambus, a packet is configured by four clocks with data transferred at both leading and trailing edges of each clock in one clock cycle.

In FIG. 1, first in cycles 0 to 3, a row packet for activating a page specified by x is issued. The x indicates a set of a device ID, a bank address, and a row address each of which is represented by the specified number of bits. Then, in cycles 7 to 10, a column packet indicating a read of data at the address specified by x0 is issued. The x0 indicates a set of a device ID, a bank address, and a column address each of which is represented by the specified number of bits. The device ID and the bank address are the same as those of x above. The column address specifies an address on a page.

Furthermore, in cycles 11 to 14, a column packet indicating a read of data at the address specified by x1 is issued. The x1 indicates a set of a device ID, a bank address, and a column address each of which is represented by the specified number of bits. The device ID and the bank address are also the same as those of x above. That is, data can be read at two addresses on the same device, band, and page by the set of a row packet and a column packet. In cycles 19 to 22, data corresponding to the first (x0) read command is read from DRAM. In cycles 23 to 26, data corresponding to the second (x1) read command is read from the DRAM.

In the example shown in FIG. 1, data is read from another band concurrently with the series of reading operations. That is, in cycles 8 to 11, a row packet for activating the page specified by y is issued. The y indicates the page located in a bank (in another device or in a non-interference bank in the same device) other than the bank indicated by the preceding x. Then, in cycles 15 to 18, a column packet indicating a read of data at the address specified by y0 is issued. The device ID and the bank address indicated by the y0 are the same as those indicated by the y. Furthermore, in cycles 19 to 22, a column packet indicating a read of data at the address specified by y1 is issued. The device ID and the bank address indicated by the y1 are also the same as those indicated by the y.

In cycles 27 to 30, data corresponding to a third (y0) read command is read from the DRAM. In cycles 31 to 34, data corresponding to a fourth (y1) read command is read from the DRAM. The same operations are performed on z, z0, z1, q, q0, and q1. The activation of a bank z not interfering with the x and y, and the activation of a bank q not interfering with the x, y, and z are performed. Data is read by issuing fifth (z0), sixth (z1), seventh (q0), and eighth (q1) read commands.

The sequential commands perform a pipeline operation for each phase of a row packet, a column packet, and a data packet. Thus, the maximum bandwidth can be obtained when access is gained by a four-stage pipeline in 32 byte units in the direct Rambus DRAM.

Therefore, access in size smaller than 32 bytes reduces an effective bandwidth. For example, 32-byte continuous data can be read at a time faster and more efficiently than the data read twice in 16 bytes units in a divisional manner.

If access occurs frequently in smaller units than 32 bytes, then access efficiency can be improved by providing a prefetch buffer in a memory controller.

FIG. 2 shows an example of a configuration of the conventional memory controller having a prefetch buffer.

In FIG. 2, a memory controller 200 is connected to bus masters 220 to 223 such as a CPU, a DMA controller, a bus bridge, etc. through a system bus 210, and also connected to DRAMs (in this example, direct RDRAM) 230 to 233. The bus masters 220 to 223 are access-adjusted by an arbiter not shown in the attached drawings to avoid an access conflict on a system bus, and to allow only one master to access the memory controller 200.

A data signal (DQA [8:0], DQB [8:0]) line 241 is bidirectional, and transmits data from the memory controller 200 to the DRAMs 230 to 233 during data write, and from the DRAMs 230 to 233 to the memory controller 200 during data read. A row signal (ROW [2:0]) line 242 and a column (COL [4:0]) signal line 243 respectively transmit a row packet and a column packet from the memory controller 200 to the DRAMs 230 to 233. Signals 244 and 245 are clock signals (CTM, CFM) on a channel.

In the memory controller 200, a control device 201 controls an operation timing of each block of the memory controller. Memory channel interface 202 transmits a read/write command on a channel after adapting it to a protocol on the memory channel, and receives data from the channel. A system bus interface 203 is used for connection to a system bus. A buffer 204 temporarily stores a read/write command. A prefetch buffer 205 stores a part of read data and its address as necessary, and transfers stored data to the system bus interface 203. Furthermore, it is provided with a valid flag not shown in the attached drawings but indicating whether or not the stored address data is valid.

Normally, access to memory is locally obtained. When data is read at an address in memory, it is expected at a high probability that data at consecutive addresses can be read within a short time.

When 16-byte data read access occurs from the bus master 220, the memory controller 200 reads 32-byte data including the 16-byte data at a specified address and the 16-byte data at the consequent address from any of the DRAMs 230 to 233. It transfers the specified 16-byte data to the bus master 220 which requested the data through a system bus 210, and stores and holds the remaining 16-byte data in the prefetch buffer 205. When a request to access a held subsequent address is issued from any of the bus masters, the memory controller 200 does not perform a reading operation on the DRAM, but transfers through the system bus interface 203 the data held in the prefetch buffer 205 to the bus master which issued the access request.

For example, assume that the bus master 220 issues a read access request for the 16-byte data stored at address h00120 to address h0012f. If the addresses are assigned to the DRAM 230, the memory controller 200 receives the request, temporarily stores it in the buffer 204, and transmits a read command packet to the corresponding of the DRAM 230 through the memory channel interface 202. At this time, a column packet for a read of the subsequent 16-byte data at the corresponding address is also transmitted. In response to the read commands, after a predetermined delay time the DRAM 230 sequentially transmits to the channel a total of 32-byte data stored at the corresponding address.

When the memory controller 200 receives the 32-byte data transmitted onto the channel by the memory channel interface 202, it transmits the first half 16-byte data from the system bus interface 203 to the bus master 220 through the system bus 210.

On the other hand, it stores the second half 16-byte data in the prefetch buffer 205 with the leading address h00130, and sets a valid flag indicating that the contents of the prefetch buffer 205 are valid. Then, upon receipt of a read access request for the 16-byte data stored at address h00130 (h indicates a hexadecimal number) to address h0013f, it immediately transmits the 16-byte data in the prefetch buffer 205 from the system bus interface 203 to the bus master 220 through the system bus 210. Thus, the efficiency of memory access can be enhanced, and the read latency can be drastically reduced.

If a read access occurs and data at an arbitrary address is stored in the prefetch buffer 205, and a write access occurs at the same address, then the memory controller 200 nullifies the contents stored in the prefetch buffer 205. In the above-mentioned example, if 16-byte consecutive data at address h00130 to address h0013f is stored in the prefetch buffer 205, and the bus master 222 issues a write request for the address range the same as or overlapping the above-mentioned address range, then the memory controller 200 immediately resets the valid flag in the prefetch buffer 205.

Thus, old data is protected from being returned to a bus master, thereby maintaining the consistency of data.

As described above, when a prefetch buffer is provided for a memory controller, the circuit scale is normally enlarged with a number of entries (a pair of an address and data stored in the buffer). Therefore, in the above-mentioned example, only one entry is made. At this time, if there is only one bus master and the master locally accesses data, then a prefetch buffer effectively function. However, if there are a plurality of bus masters, and they alternately access data at different address ranges, the contents of a prefetch buffer are frequently replaced before reference is made, thereby losing the significance of a prefetch buffer.

For example, as shown in FIG. 3, the bus master 220 issues a read access request in the first cycle for 16-byte data at address h1020 to address h102f. As a result, the prefetch buffer 205 stores 16-byte data at address h1030 to address h103f in the fifth cycle.

Then, in the sixth cycle, the bus master 223 issues a read access request for 16-byte data at address h8a40 to address h8a4f. Thus, in the tenth cycle, the 16-byte data at address h1030 to address h103f is not all referred to, but replaced with the 16-byte data at address h8a50 to address h8a5f in the prefetch buffer 205.

Then, in the eleventh cycle, when the bus master 220 issues a read access request for the 16-byte data at address h1030 to address h103f after the data read previously, the data is read from the memory because the data at these addresses are not currently stored in the prefetch buffer 205. Thus, in the fifteenth cycle, the contents of the prefetch buffer 205 are replaced with the 16-byte data at address h1040 to address h104f. Then, when the bus master 223 issues a read access request for the 16-byte data at address h8a50 to address h8a5f in the sixteenth cycle after the data read previously, the data is to be read again from the memory because the data at these addresses are not currently stored in the prefetch buffer 205.

Thus, when a plurality of bus masters are simultaneously operating, the conventional memory controller cannot efficiently control a prefetch buffer having a small number of entries.

SUMMARY OF THE INVENTION

The present invention aims at providing a memory controller capable of allowing a prefetch buffer having only a small entries to effectively function in a system including a plurality of bus masters.

According to one aspect, the present invention which achieves there objectives relates to a memory control apparatus performing a reading operation on a memory device at a request of a plurality of masters including: read means for pre-reading data subsequent to data which any of the plurality of masters requests to read; a prefetch buffer for holding a result of the pre-reading; set means for setting a specific master among the plurality of masters; and control means for determining whether or not the master which issues the request is a master set by the set means when the read request is issued from any of the plurality of masters, and storing the result of the pre-reading in the prefetch buffer when it is determined that the master which issued the request is a master set by the set means.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a table showing the relationship between a bus master and a bus master ID.

DESCRIPTION OF THE PREFERRED EMBODIMENTS

Figure 1:
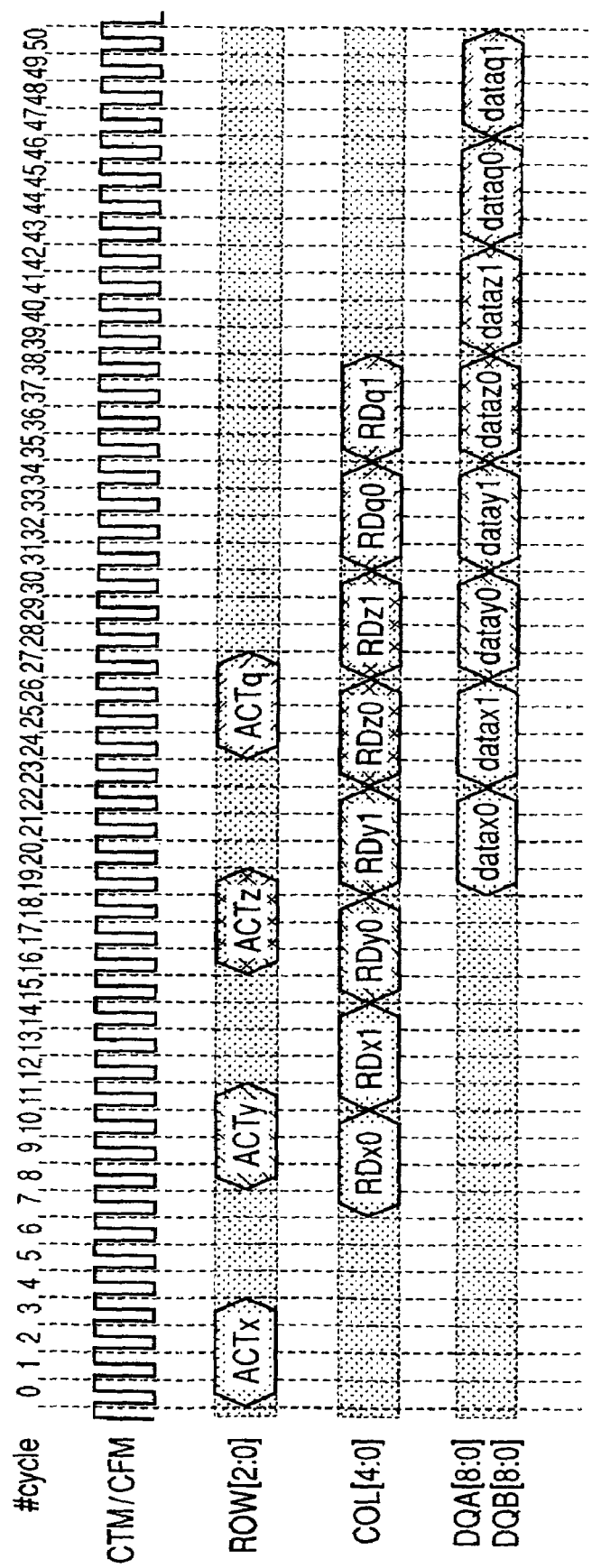
FIG. 1 is an explanatory view showing an example of a memory access protocol on a direct DRAM channel.

A preferred embodiment of the present invention is described below in detail by referring to the attached drawings.

The first embodiment of the present invention is described below by referring to FIGS. 4 and 5. For comparison, the reference numerals for the same components in FIG. 2 end with '.

Figure 2:
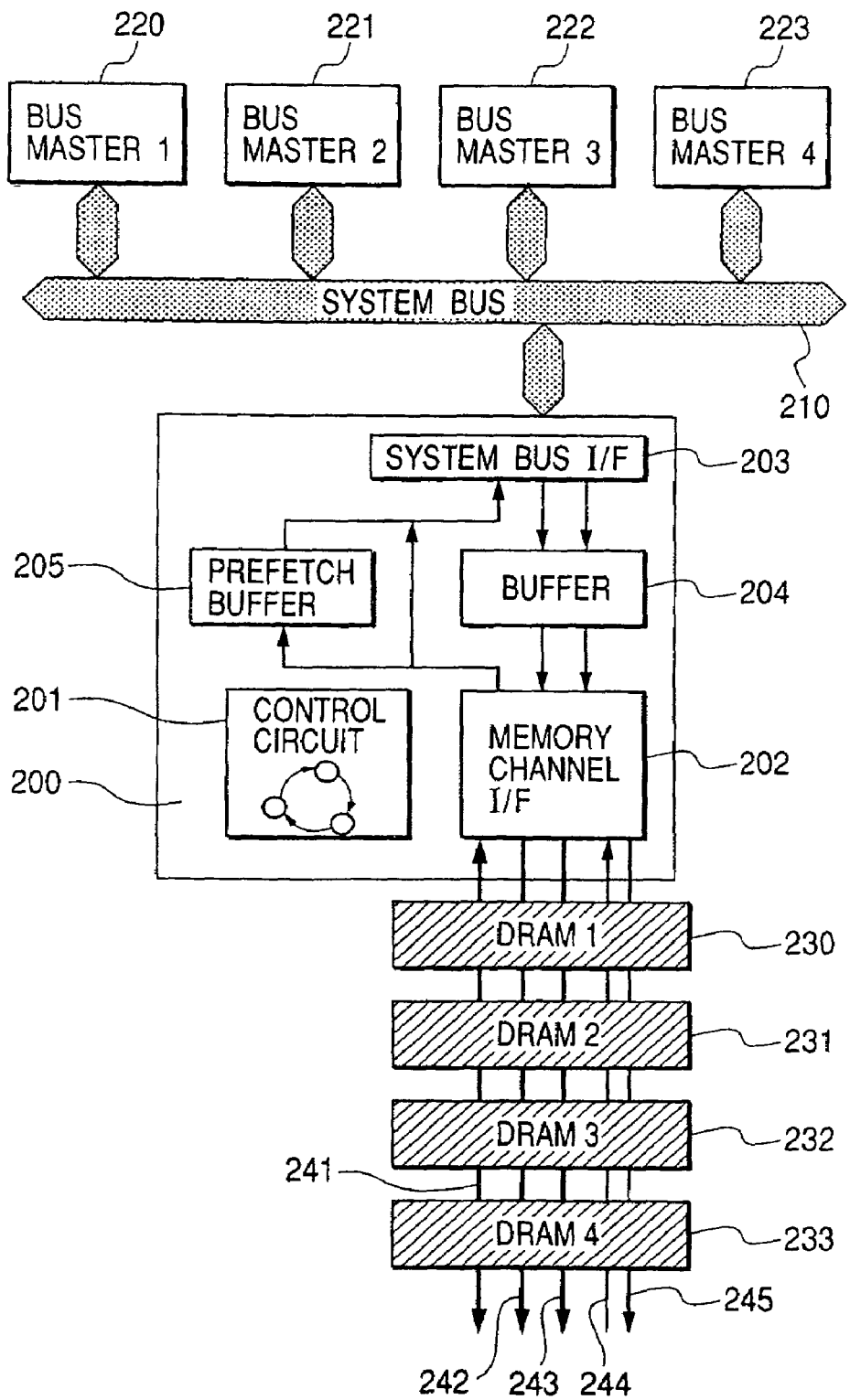
FIG. 2 is an explanatory view showing the configuration of the system including a conventional memory controller.
Figure 3:
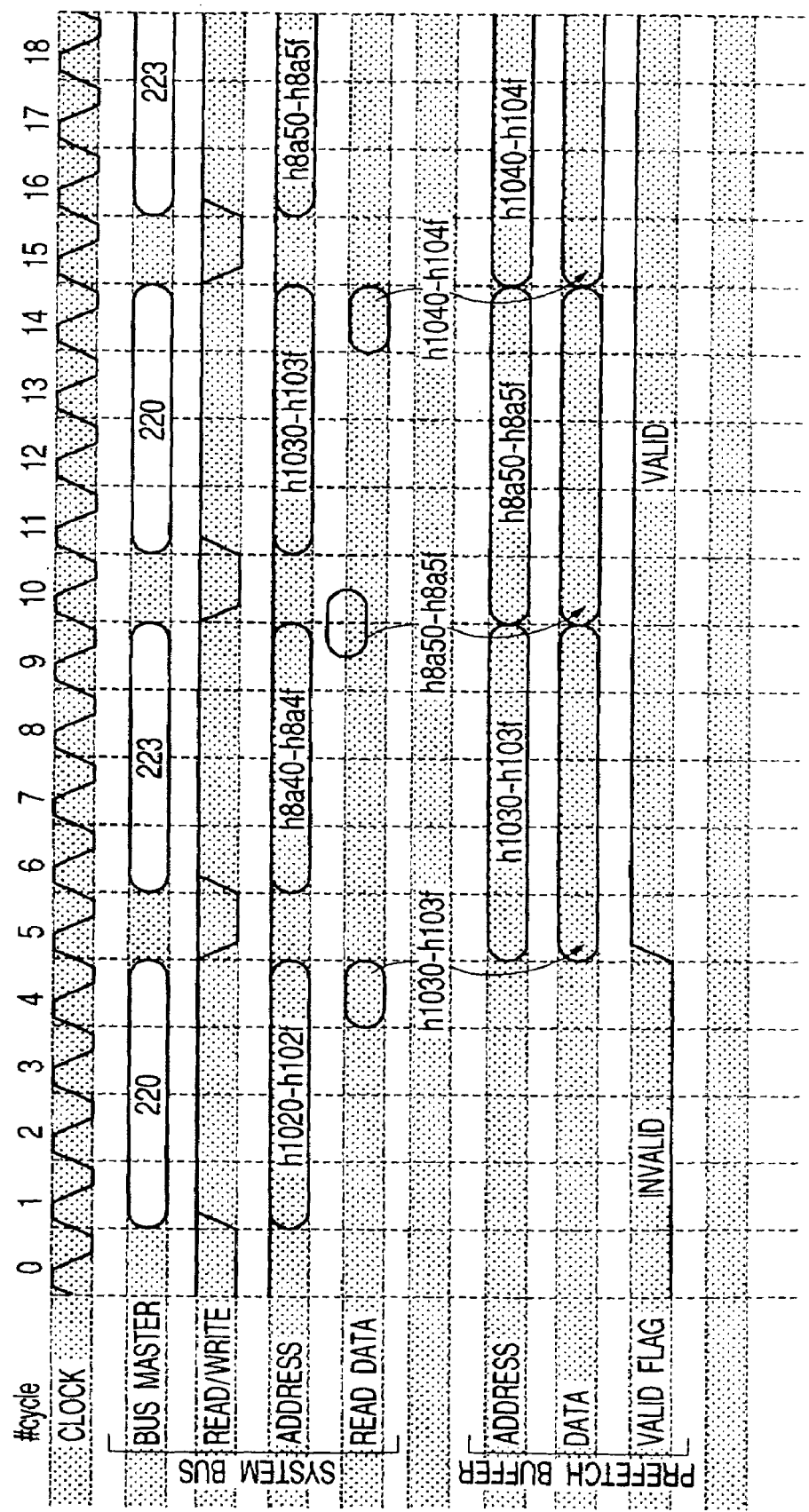
FIG. 3 is an explanatory view of the access timing on a system bus and the contents of a prefetch buffer according to a conventional technology.
Figure 4:
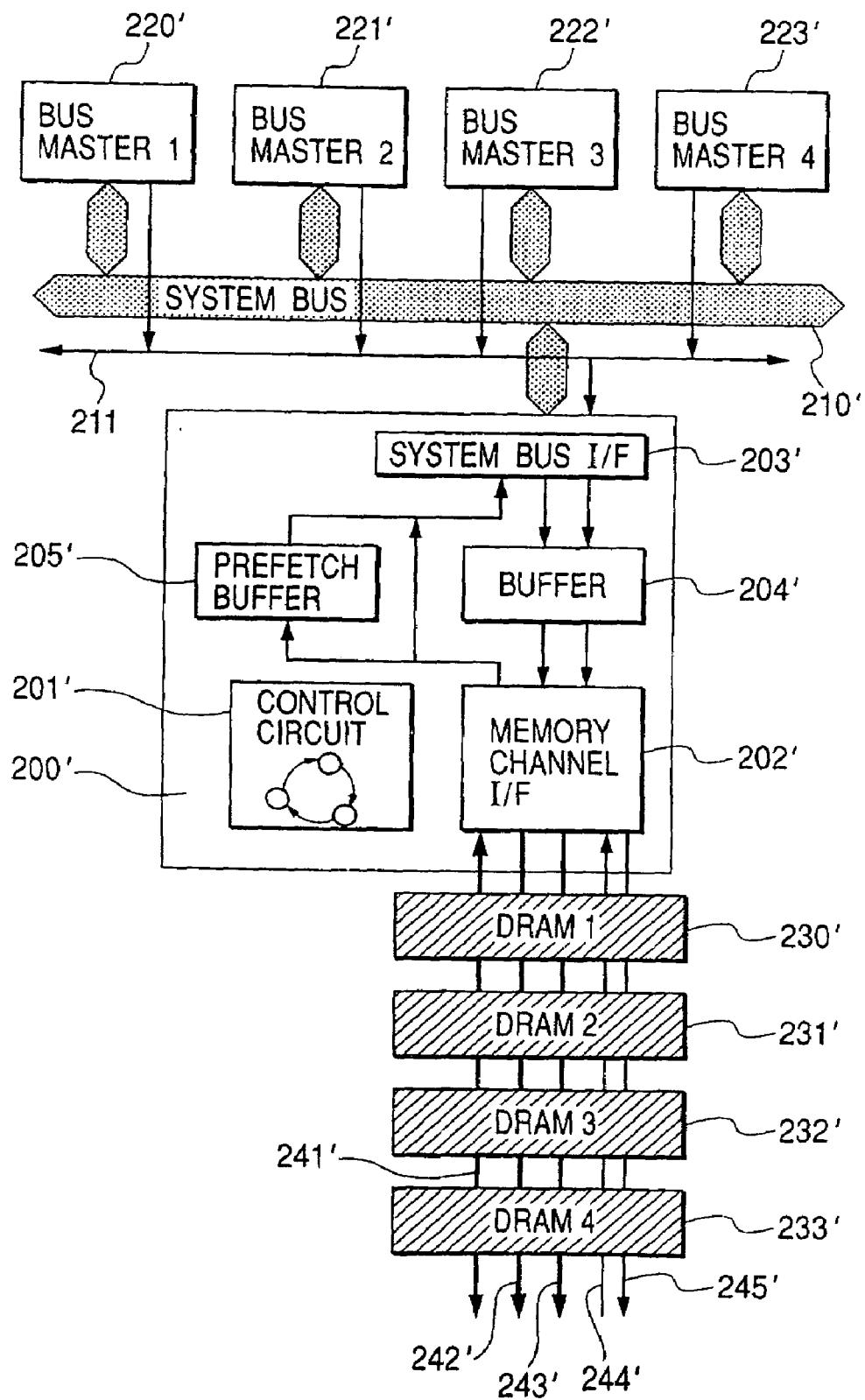
FIG. 4 is an explanatory view of the configuration of the system including a memory controller according to an embodiment of the present invention.

The difference in FIG. 4 from FIG. 2 is that a system bus 210' is provided with a signal 211 for identification of a bus master (bus master ID). This is a part of a signal group forming the system bus 210', but is separately indicated for clear explanation. It can be a signal provided for the system bus 210, or can be newly added. Recently, the integration level of a semiconductor is enhanced, and there is a system LSI in which the entire system is integrated. In a system LSI, a system bus is included in an LSI chip, and causes no problem in system design although a small number of signal lines are added.

According to the present embodiment, there can be four bus masters 220' to 223'. Therefore, two bit signal lines are included. FIG. 6 shows the relationship between the four bus masters and the bus master IDs shown in FIG. 5.

According to the present invention, the control circuit 201 further allows a register not shown in the attached drawings to set data specifying a bus master capable of replacing a prefetch buffer 205', compares the contents of the register specifying a bus master with the bus master identification signal 211, and replaces the contents of the prefetch buffer 205' only when the comparison outputs a matching result.

Figure 5:
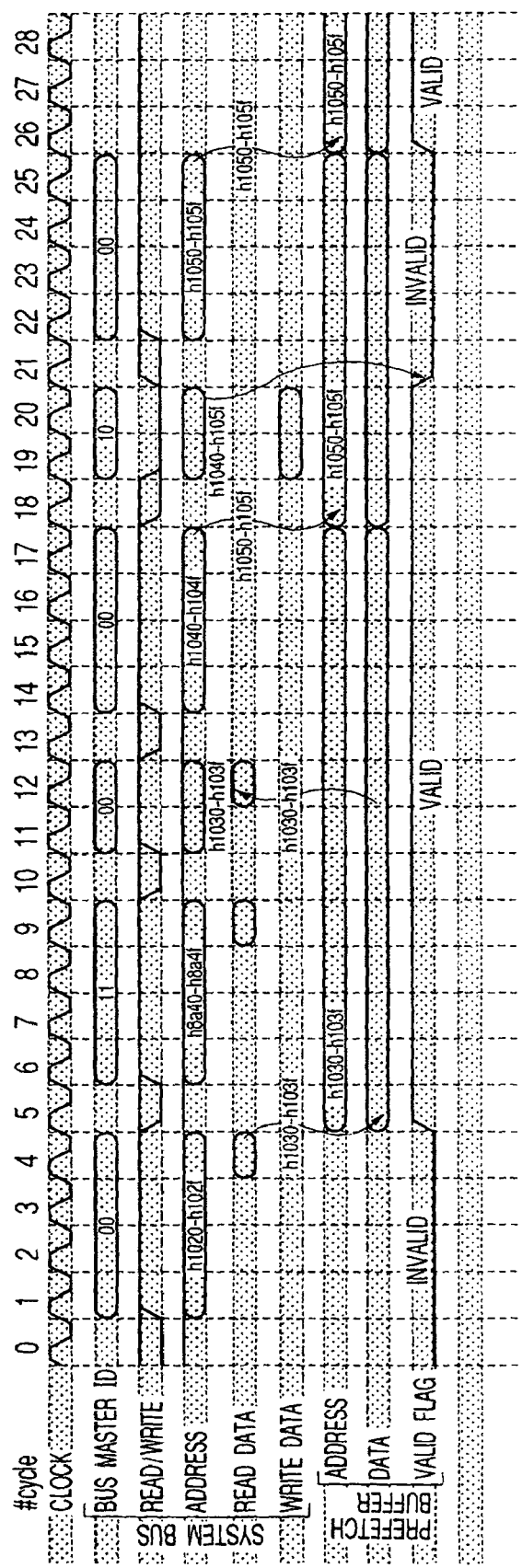
FIG. 5 is a timing chart showing an access timing on a system bus and the contents of a prefetch buffer according to an embodiment of the present invention.

FIG. 5 shows the operation of the system bus 210' using an example in which only the bus master 2201 is set in the register for specification of a bus master capable of replacing the prefetch buffer 205'.

In the first cycle, the bus master 220' issues a read access request for 16-byte data at address h1020 to address h102f. The memory controller 200' can be informed according to the bus master identification signal 211 that the read access request on the system bus is received from the bus master 220', and the bus master 220' is permitted to replace the prefetch buffer 205'. As a result, in the fifth cycle, the 16-byte data at address h1030 to address h103f consequent to the data at address h1020 to address h102f requested in the read access is stored in the prefetch buffer 205'.

Then, in the sixth cycle, the bus master 223' issues a read access request for the 16-byte data at address b8a50 to address b8a5f. A memory controller 200' can be informed according to the bus master identification signal 211 that the read access request on the system bus 210' is received from the bus master 223', and the bus master 223' is not permitted to replace the prefetch buffer 205'. Therefore, the read access cannot change the contents of the prefetch buffer 205'.

Then, in the eleventh cycle, the bus master 220' issues a read access request for the 16-byte data at address h1030 to address h103f subsequent to the data read previously. Unlike the above-mentioned conventional example, the data at the addresses is still in the prefetch buffer 205'. Therefore, in the twelfth cycle, the contents are immediately passed to the bus master 220' through the system bus 210'. In the fourteenth cycle, the bus master 220' issues a read access request for the 16-byte data at address h1040 to address h104f subsequent to the data read previously. As a result, in the eighteenth cycle, the 16-byte data at address h1050 to address h105f replaces the current data in the prefetch buffer 205'.

Afterwards, since only the bus master 220' can replace the contents of the prefetch buffer 205', the bus master 220' can effectively use the functions of the prefetch buffer 205'. In the nineteenth cycle, the bus master 222' writes 32-byte data at address h1040 to address h105f. Since the write includes the address range currently held in the prefetch buffer 205', the memory controller 200' issues a packet containing the 32-byte data to be written at the specified address, and simultaneously clears a valid flag, thereby nullifying the contents of the prefetch buffer 205'. In the twenty-first cycle, the bus master 220' issues a read access request for the 16-byte data at address h1050 to address h105f subsequent to the data read previously. However, since the contents of the prefetch buffer 205' have already been nullified, the data is read from the DRAM in the read access. Therefore, old data is not passed to the bus master 220'.

Thus, the case in which the number of entries of a prefetch buffer is one is described above according to the present embodiment. It is obvious that the present invention can be applied to any number of entries. The larger number of entries, the less reduction of the effectiveness of a prefetch buffer although the prefetch buffer is set to be replaced for a larger number of bus masters.

Furthermore, according to the present embodiment, the data stored in a prefetch buffer is stored at an address subsequent to the address requested to be read by a bus master, but 32-byte block including the data at the address of the read request can be specified.

According to the present embodiment, only a read/write access in 32- or 16-byte data units is explained, but access in a smaller size units can be realized. In this case, 32-byte data including data at a 32-byte data boundary can be simultaneously read, and can be stored in the prefetch buffer.

In the present embodiment, when a write to a range overlapping the data held in a prefetch buffer occurs, the contents of the prefetch buffer is nullified. However, the contents of the prefetch buffer can be replaced with the data to be written.

Furthermore, in the present embodiment, the direct DRAM is used as DRAM, and the bandwidth indicates the maximum value when 32-byte data is transferred, but any type of DRAM or storage device can be obviously applied for the present invention in transferring an applicable size of data.

According to the present embodiment, a bus master capable of replacing the contents of a prefetch buffer can be changed by setting a register, but a bus master capable of replacing the contents of a prefetch buffer can be fixed from the beginning.

According to the above-mentioned embodiment, in the memory control apparatus having a prefetch buffer, since a master capable of replacing the contents of the prefetch buffer can be restricted, the function of the prefetch buffer can be effectively used when a plurality of bus masters simultaneously access the memory.

Furthermore, the present invention can also be applied to a system formed by a plurality of equipment units (for example, the main unit of a computer, interface equipment, a display, etc.) and a single equipment unit in a scope in which the function of the above-mentioned embodiment can be realized.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A memory control apparatus which performs a reading operation on a memory device at a request of a plurality of masters, comprising:

read means for pre-reading data subsequent to data which any of the plurality of masters requests to read;

a prefetch buffer for holding a result of the pre-reading, said prefetch buffer storing one or more sets of information including data, an address of the data, and a flag indicating the validity of the data;

set means for setting a specific master among the plurality of masters; and control means for determining whether or not a present master which issues a read request is the specific master set by said set means when the read request is issued from the present master, comparing a requested address with the address of data stored in said prefetch buffer, checking the flag of the data, returning the data as read data of the present master when the addresses match each other, and the flag is a valid flag, storing a result of the pre-reading in said prefetch buffer when there is no matching data and it is determined that the present master is the specific master, and refraining from changing the content of said prefetch buffer when it is determined that the present master is not the specific master.

2. The memory control apparatus according to claim 1, wherein said set means can arbitrarily set the specific master among the plurality of masters.

3. The memory control apparatus according to claim 1, wherein said apparatus is connected to the plurality of masters through a shared bus.

4. The memory control apparatus according to claim 1, wherein said read means simultaneously pre-reads data and reads data requested by the present master.

5. The memory control apparatus according to claim 1, wherein said read means simultaneously reads data requested by the present master and pre-reads data subsequent to the requested data.

6. The memory control apparatus according to claim 5, wherein said prefetch buffer stores data requested by the master and data subsequent to the requested data.

7. The memory control apparatus according to claim 1, wherein when the present master requests a write, a requested address is compared with the address of data stored in said prefetch buffer, and the flag is changed into a nullified state when the addresses match each other.

8. The memory control apparatus according to claim 1, wherein said set means can set a plurality of specific masters.

* * * * *